Nov. 4, 1952          N. S. AMATO ET AL          2,616,755
                ANTIRATTLE DEVICE FOR VEHICLE WINDOWS
                        Filed Oct. 9, 1950
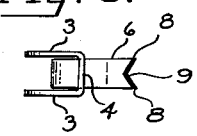
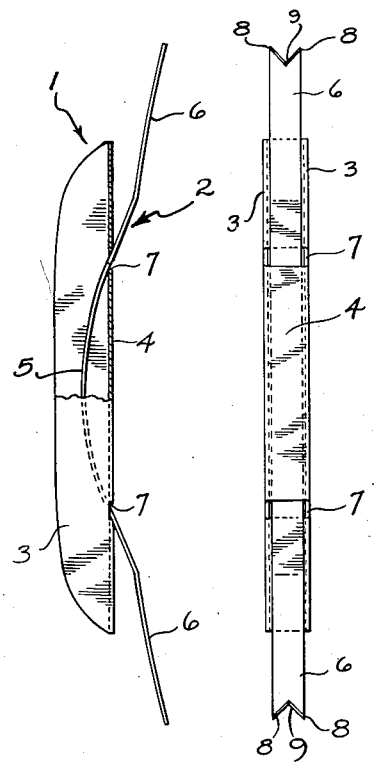
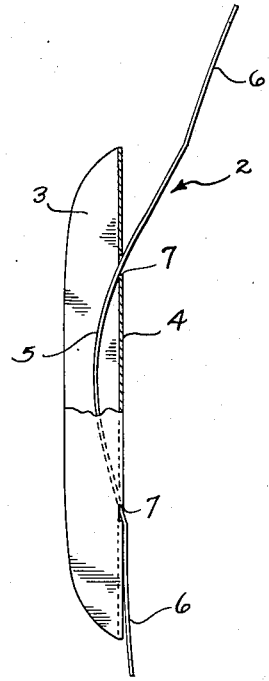
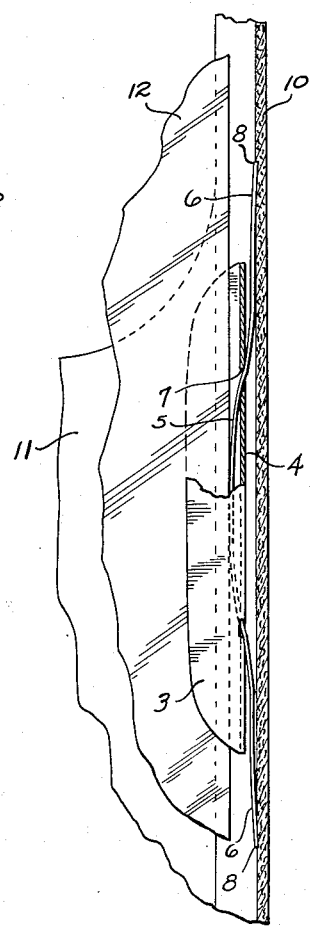
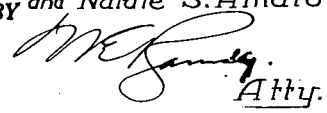
INVENTORS
William I. Lambert
and Natale S. Amato
BY
Atty.

Patented Nov. 4, 1952

2,616,755

UNITED STATES PATENT OFFICE 2,616,755

ANTIRATTLE DEVICE FOR VEHICLE WINDOWS

Natale S. Amato and William I. Lambert, Portland, Oreg.

Application October 9, 1950, Serial No. 189,170

12 Claims. (Cl. 296—44.5)

This invention relates to an antirattle device for insertion in the guide channel of an automobile window where the device will bear upon and frictionally engage both the end and the sides of the window glass to prevent breakage by vibration and to prevent rattling.

One object of our invention is to provide an antirattler having integral flange and web portions disposed substantially at right angle to one another whereby both sides of a window glass are frictionally engaged by the flange portion and the end is similarly engaged by a resilient member carried by the web portion.

Another object of our invention is to provide an antirattle device which is channel shaped to conform to the guide channel of an automobile window and which carries a resilient leaf spring arranged frictionally to engage and hold the window glass against vibration or rattle whether the window be in an up, down, or intermediate position.

Antirattle devices today are in common use in conjunction with double run windows for houses and in conjunction with other closures or weatherstripping subject to gusts of wind or vibration. Many of these devices, it is claimed, are also useful in conjunction with automobile windows. Still others are designed exclusively for automobiles. We have found by experience, however, that the majority of these antirattlers are of limited utility and require a somewhat complex installation procedure. Furthermore, they possess certain inherent disadvantages which preclude their use, efficiency, to prevent the rattle so common to an automobile window and which render them ill adapted to mass production.

One such inherent disadvantage stems from the manner in which the conventional antirattler is installed. Thus, when used in conjunction with a window other than an automobile window, screws, nails, or sharp, wood-engaging points may be employed to secure the antirattler to the window sash or guide channel. An automobile window, however, has no sash and the guide channel thereof is usually a metal channel lined with flock or cloth. Sharp points are ill adapted to secure an antirattler to such a channel since the points tend to tear the cloth or dislodge the flock. For similar reasons, screws, nails, and rivets are equally ineffective, damaging, or prohibitive in cost. In view of this problem and these disadvantages, we have included a novel leaf spring securing means within the scope of our inventive concept. Such a means holds our antirattler securely in place yet does not damage the window channel nor is the installation cost thereof so high as to price our invention out of the market.

Accordingly, an other object of our invention is to provide the terminal end of our antirattler leaf spring engaging means with an elongated arc portion terminating in two points which are spaced laterally from one another by a notch to prevent dislodgment of the antirattler without the points digging into or otherwise marring the guide channel of an automobile window.

Another disadvantage which we find inherent in the conventional antirattler lies in the manner by which the glass is held. Thus, automobile windows have no sash to which or upon which an antirattler may be secured or bear. Instead, side sway of the window must be prevented by engaging frictionally the glass per se. As an automobile grows older and the repeated vibrations induced in the window glass by road use and door slamming begin to take their toll, the glass develops side play as well as end play within the guide channel. Such side play allows the window to rattle while the car is being driven and, in extreme cases, the window glass may break when the door is slammed shut. We have become concerned with these problems and have observed that the conventional antirattlers fail to provide an efficient solution.

Accordingly, a further object of our invention is to provide an antirattler with a channel-shaped shoe which is adapted to lie within the guide channel of a window with the channel flange portions disposed parallel to the sides of the glass. These flange portions are spaced apart substantially the thickness of the window glass and are resilient so as to bear upon and frictionally engage the sides of the glass and prevent breakage or rattling.

Still further, one of the objects of our invention is to provide an antirattle device which may be inserted within the lower portion of an automobile window guide channel without disassembling the automobile door, yet which will remain anchored in place securely as the window is raised and lowered and which will, in all positions of the window, frictionally engage both the sides and ends thereof to prevent side sway and rattling, respectively.

These and other objects and advantages of our invention will be set forth in the following detailed description taken in conjunction with the accompanying drawings, wherein:

Figs. 1, 2, and 3 are related side, bottom, and end views, respectively, showing the channel-shaped shoe and arcuate leaf spring of our antirattler in the position they assume after assembly but prior to their insertion within the guide channel of an automobile window;

Fig. 4 is a side view, partially broken away, similar to Fig. 1 but showing the arcuate leaf spring member in position with one end thereof substantially flush with the outside face of the channel web so the lower end of the antirattler may be inserted between the glass and the guide channel of an automobile window; and Fig. 5 is a side view, partially broken away, showing an automobile door, window glass, and guide channel with our antirattler in operative position so as to engage frictionally both the end and sides of the window glass.

We prefer to form the antirattler of our invention in two parts. The first such part is a channel-shaped shoe 1 having integral flange and web portions 3 and 4, respectively. The second part of our antirattler is an elongated resilient leaf spring 2 having a medial arcuate portion 5 and identical terminal ends 6 formed on an arc of greater radius than the medial arcuate portion. In the preferred embodiment of our invention, both parts are made of metal. For example, the channel-shaped shoe 1 may be formed from sheet aluminum and the arcuate leaf spring 2 may be formed of spring steel. However, since other materials such as metal substitutes or plastics may be used with equal effectiveness, we do not intend to limit the scope of our inventive concept to the use of any specific materials.

With reference to the channel-shaped shoe 1, we prefer to space the two flange portions 3 by a distance substantially equal to the thickness of a window glass. Thus, when the antirattler is inserted in the guide channel of an automobile window, as shown in Fig. 5, the outer faces of the flange portions 3 engage the guide channel while the inner faces thereof engage frictionally the opposite sides of the window glass. Furthermore, since the flange portions 3 are somewhat resilient, the window glass is prevented from rattling and, when the automobile door is slammed, the window glass will not break because it has no side play.

Intermediate the ends of the shoe, the web portion 4 is pierced by two spaced lateral slots 7. During assembly of our antirattler, the leaf spring 2 is threaded through these slots so as to lie in the position shown in Figs. 1 to 3, inclusive. In such a position, the longitudinal length of each slot 7 is sufficient to pass the medial arcuate portion 5 of the leaf spring. This longitudinal length is small enough, however, to cause the edges of each slot frictionally to engage the opposed surfaces of the leaf spring. In the positions of Figs. 1 to 4, this frictional contact is slight and little effort is required to effect a longitudinal movement of the leaf spring 2 with respect to the channel-shaped shoe 1. However, in the operative position of Fig. 5, the leaf spring is compressed and the opposite faces of the medial arcuate portion 5 engage the walls of the slots 7 tightly to grip frictionally the spring and prevent relative movement between the channel and the spring.

As shown in Figs. 1 and 4, the elongated terminal ends of the leaf spring 6 are formed on an arc of greater radius than the medial arcuate portion 5. Furthermore, the leaf spring 2 terminates in two points 8 spaced from one another by a notch 9. This pointed end construction, together with the slight arc embodied in each terminal end 6, is of special importance in adapting our antirattler for use within the guide channel of an automobile window. Thus, the terminal arcuate portions 6 cause the pointed ends 8 and notch 9 to be embedded in the flock or cloth lining 10 (see Fig. 5) in a guide channel. This prevents physical dislodgment of the antirattler once it is in operative position. This is for the reason that the fibers of the flock or cloth lining 10 are pressed down by the pointed ends 8 yet the individual fibers, within the notch 9, spring up and abut the pointed ends 8 and the oblique margins thereof. That is to say, the pointed ends 8 and the notch 9 nest in the flock or cloth lining 10 in a secure manner yet they do not tear or damage this lining as would a sharp turned-over or gouging end.

The unique combination and coaction of our channel-shaped shoe and arcuate leaf spring permit ready insertion of our antirattler in the guide channel of an automobile window. Referring to Fig. 5, we have therein shown a portion of an automobile door 11 having a window glass 12 and a guide channel backed by the flock or cloth lining 10. When our antirattler is to be inserted, the leaf spring 2 is moved longitudinally through the slots 7 so that one arcuate end portion 6 lies substantially flush with the outer face of the web 4 as shown in Fig. 4. The automobile window is then rolled down as far as it will go and the antirattler is slipped down the guide channel with the two flange portions 3 slidably encompassing the sides of the window glass 12. Since the lower terminal end 6 lies substantially flush with the web 4 at this time, one can use his forefinger to push the antirattler down in the guide channel for a considerable distance. As the device is pushed down, of course, the bowed leaf spring 2 is compressed and flattened somewhat to allow the medial arcuate portion 5 to pass over the end of the window glass 12.

Once in position, the window glass 12 is rolled up and the channel-shaped shoe 1 follows along for a short distance while the leaf spring 2 slides within the slots 7. After this short movement, however, the parts of the antirattler assume the position shown in Fig. 5 and the frictional contact between the slots 7 and the leaf spring 2 fixes the shoe 1 against further movement relative to the spring. Furthermore, in this position, the arcuate terminal ends 6 engage by embedding in the flock or cloth lining 10 and prevent physical movement or dislodgment of the spring. Thus, the entire antirattler is anchored in place and will not move because of the concurrent coaction of the terminal ends 6 and the friction between the slots and spring. In contrast to many conventional antirattlers, our device does not creep, compress, harden, or wear unduly. Furthermore, the resiliency of the leaf spring 2 and the resiliency of the flange portions 3 secure both the end and the sides of the window glass 12 against movement or rattling.

Our antirattler may be inserted within the lower portion of an automobile channel without disassembling the automobile door yet it will remain fixed in place securely as the window is raised and lowered repeatedly and will, in all positions of the window, frictionally engage both the sides and the end of the glass to prevent rattling. This again is in contrast to many conventional antirattlers which either do not hold both the sides and end of the window glass or do not hold the window securely in both the raised and lowered positions. In accord with another object of our invention, we have provided the terminal ends of our antirattler leaf spring with an elongated arcuate portion terminating in two points spaced, one from another, by a notch to prevent movement of the antirattler without digging the points into or otherwise marring the guide channel of an automobile window. Our antirattler can be mass produced at a minimum cost so as to compete price-wise as well as functionally with any antirattler known to us.

We claim:

1. An antirattler for insertion within the guide channel of a window, comprising an elongated shoe having integral flange and web portions disposed substantially at right angles to one another, and a bowed resilient member unsecured to said shoe and free to move relative thereto when the resilient member is not under compression, said web portion having a slot means formed therethrough and slidably receiving said bowed resilient member, the frictional contact between said slot means and resilient member being proportioned and arranged to hold said shoe against movement relative to said bowed member when the latter is compressed and flattened somewhat.

2. An antirattler for insertion within the guide channel of a window to bear upon and guide both the end and sides of the window glass, comprising an elongated shoe having integral flange and web portions disposed substantially at right angles to one another, and an elongated resilient member unsecured to said shoe and free to move relative thereto when not under compression, said web portion having an inner and an outer face and having a slot means formed therethrough slidably to receive said resilient member, said resilient member having a medial arcuate portion disposed adjacent said web inner face and terminating in an elongated gripping end disposed adjacent but spaced from said web outer face, the frictional contact between said slot means and the medial arcuate portion of said resilient member being proportioned and arranged to hold said shoe against movement relative to said member when the said arcuate portion is compressed, said elongated gripping end being movable with said unsecured resilient member to lie substantially flush with the outer face of said web when said antirattler is to be inserted in the guide channel of a window, and said elongated gripping end terminating in two points spaced apart by a notch.

3. An antirattler for a window, comprising a shoe having an integral flange and web portion, a bowed resilient bias member unsecured to said shoe, said web having a pair of spaced slot means formed therethrough for slidably passing and gripping, selectively, said bowed resilient bias member.

4. An antirattler, comprising a channel-shaped shoe having a pair of spaced flanges joined by a web, said flanges being spaced substantially the thickness of a window glass slidably to engage the sides thereof, and a resilient bias member, said web having a pair of spaced slot means formed therethrough for slidably passing and gripping, selectively, said resilient bias member which is threaded through and projects beyond both of said slot means, said slot means and resilient member being in frictional contact while in operative position to hold said shoe against movement relative to said member.

5. An antirattler for a window, comprising a channel-shaped shoe having a pair of spaced flanges joined by a web, a pair of spaced slots formed through said web intermediate the ends thereof, and an elongated resilient member slidably receivable within said slots so the terminal ends thereof project therethrough to anchor the antirattler against movement.

6. An antirattler, comprising a channel-shaped shoe having a pair of spaced flanges joined by a web, said flanges being spaced substantially the thickness of a window glass slidably to engage the sides thereof, a pair of spaced slots formed through said web intermediate the ends thereof, and an elongated resilient member slidably receivable within said slots so the terminal ends thereof project therethrough to anchor the antirattler against movement, at least one of said resilient member terminal ends carrying a gripping means for removably anchoring said antirattler against movement.

7. An antirattler for a window, comprising a channel-shaped shoe having a pair of spaced flanges joined by a web, a pair of spaced slots formed through said web intermediate the ends thereof, and an elongated resilient member slidably threaded through said slots with the medial portion thereof disposed adjacent the inner face of said web and the terminal ends thereof disposed adjacent the outer face of said web, at least one of said resilient member terminal ends carrying a gripping means for removably anchoring said antirattler against movement.

8. An antirattler, comprising an elongated shoe having integral flange and web portions disposed substantially at right angles to one another, a pair of spaced slots carried by said web intermediate the ends thereof, and an elongated leaf spring projecting through both said slots with the medial portion thereof disposed intermediate said slots and adjacent the inner face of said web, the medial portion of said leaf spring being arcuate to define a resilient arc adapted slidably to engage the edge of a window, at least one terminal end of said leaf spring being formed on an arc of greater radius than said medial arcuate portion to cause said end to engage frictionally a window guide channel when in operative position.

9. An antirattler, comprising a channel-shaped shoe having a pair of resilient spaced flanges joined by a web, said flanges being spaced substantially the thickness of a window glass slidably to engage the sides thereof, a pair of spaced slots carried by said web intermediate the ends thereof, and a resilient leaf spring projecting through both said slots with the medial portion thereof disposed intermediate said slots and adjacent the inner face of said web, the terminal ends of said leaf spring being disposed adjacent but spaced from the outer face of said web, at least one terminal end of said leaf spring being formed on an arc to cause said end to engage frictionally a window guide channel when in operative position.

10. An antirattler, comprising a channel-shaped shoe having a pair of spaced flanges joined by a web, said flanges being spaced substantially the thickness of a window glass slidably to engage the sides thereof, a pair of spaced lateral slots carried by said web intermediate the ends thereof, and an elongated leaf spring projecting through both said slots with the medial portion thereof disposed intermediate said slots and adjacent the inner face of said web, the terminal ends of said leaf spring being disposed adjacent but spaced from the outer face of said web, at least one terminal end of said leaf spring being formed on an arc to cause said end to engage frictionally a window guide channel when in operative position, said leaf spring terminating in two points spaced laterally from one another by a notch to prevent physical dislodgment of said spring.

11. An antirattler, comprising a channel-shaped shoe having a pair of resilient spaced flanges joined by a web, said flanges being spaced substantially the thickness of a window glass slidably to engage the sides thereof, a pair of spaced slots carried by said web intermediate the ends thereof, and a resilient leaf spring projecting through both said slots with the medial portion thereof disposed intermediate said slots and adjacent the inner face of said web, the terminal ends of said leaf spring being disposed adjacent but spaced from the outer face of said web, the medial portion of said leaf spring being arcuate to define a resilient arc adapted slidably to engage the edge of a window, at least one terminal end of said leaf spring being formed on an arc of greater radius than said medial arcuate portion to cause said end to engage frictionally a window guide channel when in operative position, said leaf spring terminating in two points spaced laterally from one another by a notch to prevent physical dislodgment of said spring as by a sliding engagement of a moving window with said medial arcuate portion.

12. An antirattler, comprising a shoe having integral flange and web portions for engaging the side and edge of a window glass, respectively, said web portion having means for passing slidably and gripping frictionally, selectively, an elongated resilient member, said elongated resilient member being unsecured to said shoe and having an end portion projecting through and beyond said web to lie substantially flush with said web when said means defines said passing condition and to lie spaced from said web when said means defines said gripping condition.

NATALE S. AMATO.
WILLIAM I. LAMBERT.

REFERENCES CITED

The following references are of record in the file of this patent:

UNITED STATES PATENTS

| Number | Name | Date |
|---|---|---|
| 1,636,255 | Stickle | July 19, 1927 |
| 2,504,510 | Ernest | Apr. 18, 1950 |
| 2,527,515 | Hardemon | Oct. 31, 1950 |
| 2,539,064 | Ernest | Jan. 23, 1951 |